(12) United States Patent
Fujino et al.

(10) Patent No.: US 7,852,541 B2
(45) Date of Patent: Dec. 14, 2010

(54) LIGHT DEFLECTOR AND LIGHT SCANNING DEVICE

(75) Inventors: Hitoshi Fujino, Kasugai (JP); Toshio Sakai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 317 days.

(21) Appl. No.: 12/019,932

(22) Filed: Jan. 25, 2008

(65) Prior Publication Data

US 2008/0180770 A1    Jul. 31, 2008

(30) Foreign Application Priority Data

Jan. 26, 2007    (JP)    ............... 2007-016526

(51) Int. Cl.
*G02B 26/00*    (2006.01)
(52) U.S. Cl. .................................. 359/213; 359/221.1
(58) Field of Classification Search ............ 359/212.1, 359/212.2, 213.1, 214.1, 221.1, 221.2, 223.1, 359/226.2
See application file for complete search history.

(56) References Cited

U.S. PATENT DOCUMENTS

| | | | |
|---|---|---|---|
| 6,769,616 B2 | 8/2004 | Fu et al. | |
| 7,014,115 B2 | 3/2006 | Fu | |
| 7,034,370 B2 | 4/2006 | Kuo | |
| 7,154,652 B2 | 12/2006 | Kobayashi | |
| 7,298,014 B2 * | 11/2007 | Diaz | 257/414 |
| 7,456,497 B2 * | 11/2008 | Higashi | 257/704 |
| 7,593,029 B2 * | 9/2009 | Satoh et al. | 347/243 |

FOREIGN PATENT DOCUMENTS

| | | |
|---|---|---|
| JP | 2004-177957 | 6/2004 |
| JP | 2004-198500 | 7/2004 |
| JP | 2005-070791 | 3/2005 |
| JP | 2005-250307 | 9/2005 |

* cited by examiner

*Primary Examiner*—Frank G Font
(74) *Attorney, Agent, or Firm*—Banner & Witcoff, Ltd (57) ABSTRACT

A light deflector includes: an oscillating mirror which includes a reflecting surface and which rotationally oscillates about a first axis; a mirror holder which holds the oscillating mirror; and a wiring drawn out from a surface of the mirror holder at a drawn-out start position, the drawn-out start position lying on a plane which includes the first axis and which is orthogonal to the reflecting surface of the oscillating mirror in a still state.

21 Claims, 13 Drawing Sheets

LIGHT DEFLECTOR AND LIGHT SCANNING DEVICE

CROSS-REFERENCE TO RELATED APPLICATION

This application claims priority from Japanese Patent Application No. 2007-016526, filed on Jan. 26, 2007, the entire subject matter of which is incorporated herein by reference.

TECHNICAL FIELD

Aspects of the present invention relate to a light deflector and a light scanning device including the light deflector in a laser printer or the like.

BACKGROUND

Generally, a light deflector for use in a scanner apparatus of a laser printer or the like includes a polygon mirror. However, in recent years, a light deflector including a MEMS (Micro Electro Mechanical System) mirror instead of the polygon mirror has been proposed (e.g., refer to JP-A-2004-198500).

The MEMS mirror is one of products in the field of the micro electrical mechanical systems, which are manufactured by applying a semiconductor process technology. Generally, the MEMS mirror has a rotationally oscillating plate formed by cutting out a planar substrate, in which a total reflection mirror face is formed in the center of the surface by means of evaporation and so on. And the oscillating mirror including this rotationally oscillating plate is supported by the substrate to be rotated and oscillated (vibrated) about a shaft portion cut and left on the central line as the shaft.

A MEMS mirror, which is driven by an electromagnetic drive method among the MEMS mirror of this type, includes a plane coil around the mirror face on an oscillating mirror and a permanent magnet generating a magnetic field to the plane coil, on the substrate surrounding the oscillating mirror.

The MEMS mirror of this type, which is driven by an electromagnetic drive method, supplies a predetermined drive signal to the plane coil on the oscillating mirror via a wiring drawn out from the substrate, and generates the Lorenz's force in accordance with the drive signal to rotate and drive the oscillating mirror.

SUMMARY

In the light deflector including the MEMS mirror as previously described, when the oscillating mirror rotationally oscillates, the oscillation transmits to the wiring drawn out from an oscillating mirror holding member such as the substrate. Therefore, the wiring is resonated and makes noise. Especially, when the wiring is drawn out from an edge part of the oscillating mirror holding member located sideways of an oscillating end of the oscillating mirror, the tendency of the wiring to make noise is increased.

Aspects of the present invention relate to the above problem. According to at least one aspect of the present invention, a light deflector may be provided that can reduce the oscillation noise of the wiring caused by rotational oscillation of the oscillating mirror.

According to an aspect of the present invention, a light deflector includes: an oscillating mirror which includes a reflecting surface and which rotationally oscillates about a first axis; a mirror holder which holds the oscillating mirror; and a wiring drawn out from a surface of the mirror holder at a drawn-out start position, the drawn-out start position lying on a plane which includes the first axis and which is orthogonal to the reflecting surface of the oscillating mirror in a still state.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION

First Exemplary Embodiment

Figure 1:
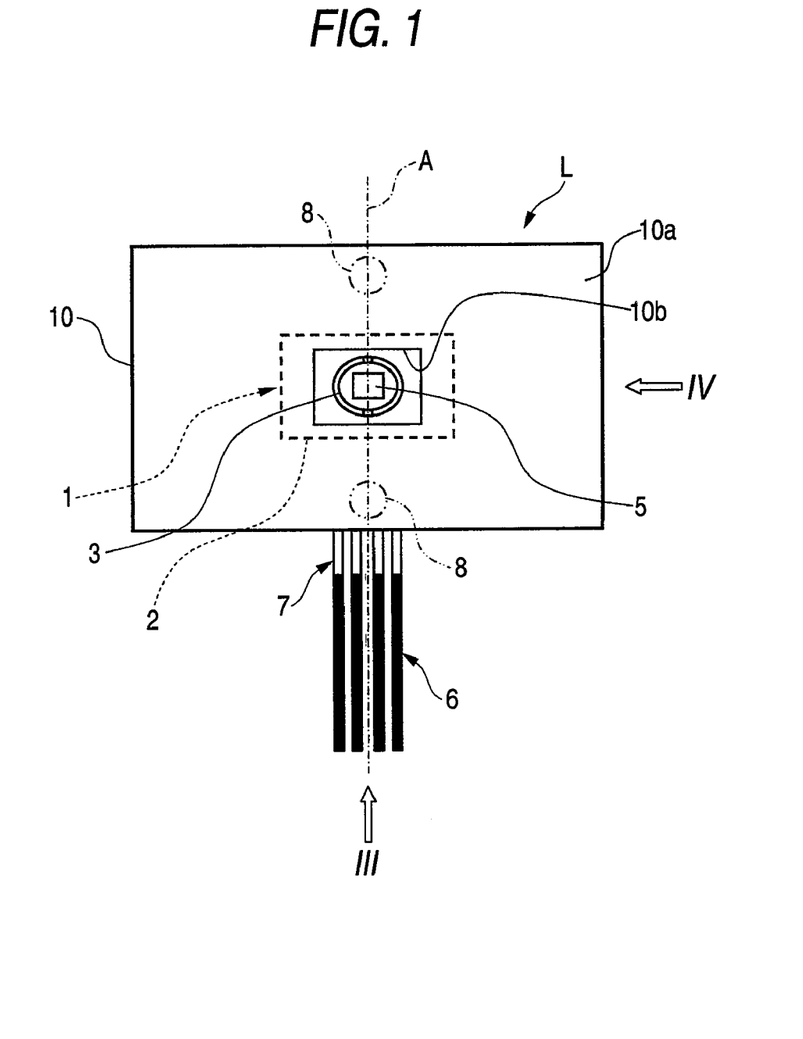
FIG. 1 is a plan view showing a light deflector according to a first exemplary embodiment of the present invention.
Figure 2:
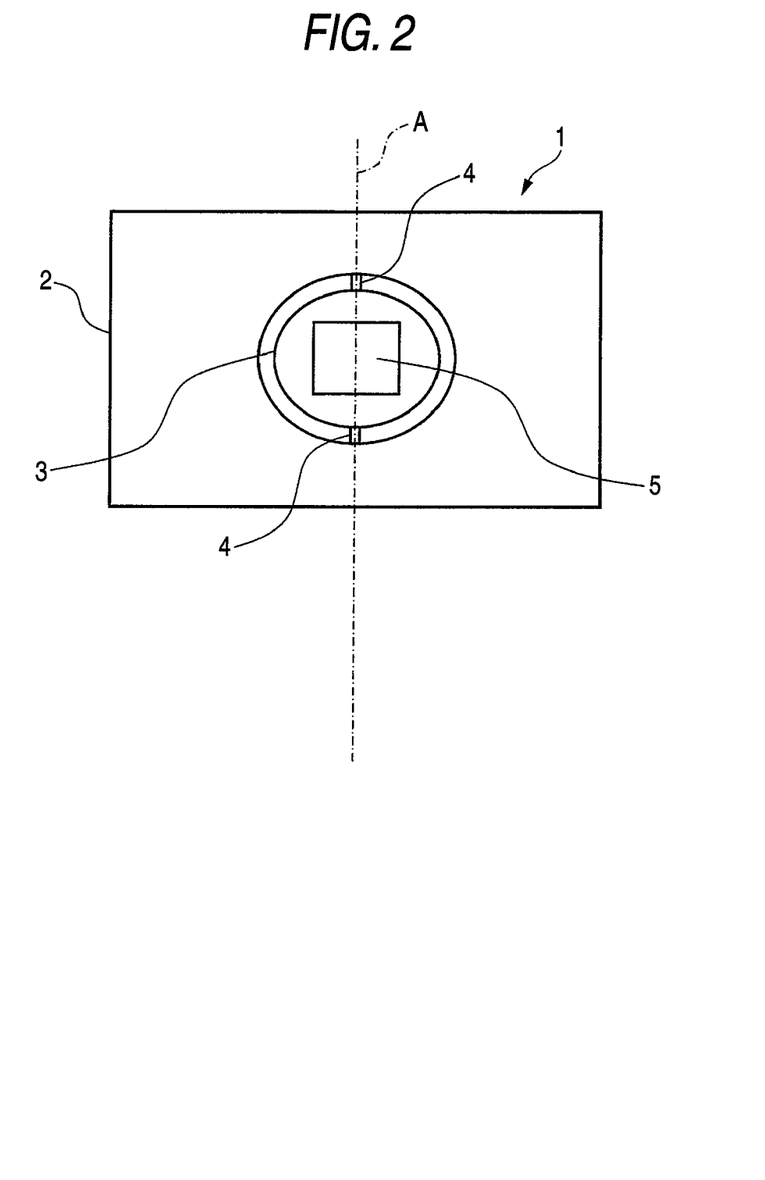
FIG. 2 is a plan view of an MEMS mirror.
Figure 3:
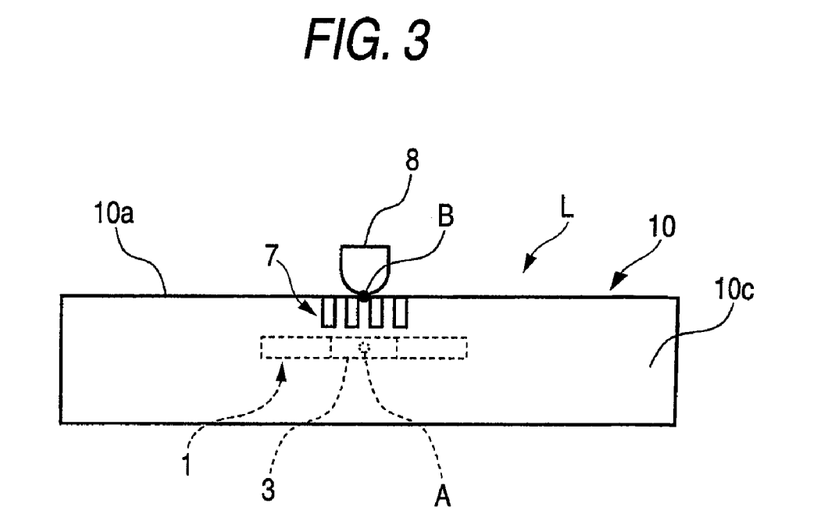
FIG. 3 is a side view of the light deflector as seen from the arrow III in FIG. 1.
Figure 4:
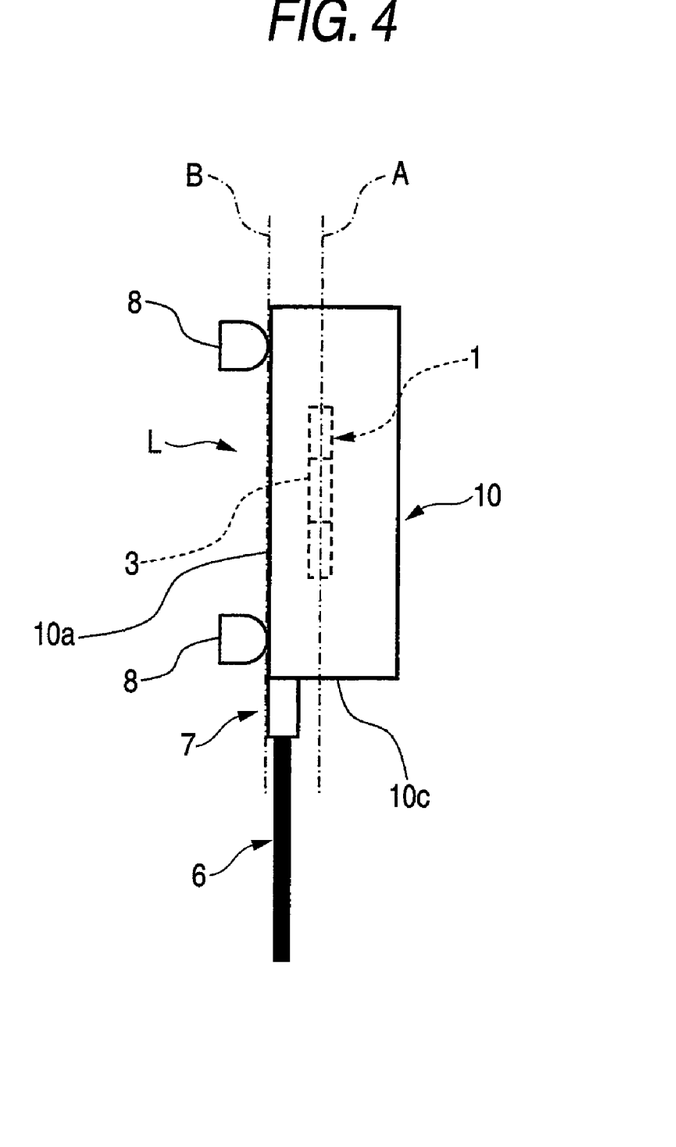
FIG. 4 is a side view of the light deflector as seen from the arrow IV in FIG. 1.
Figure 12:
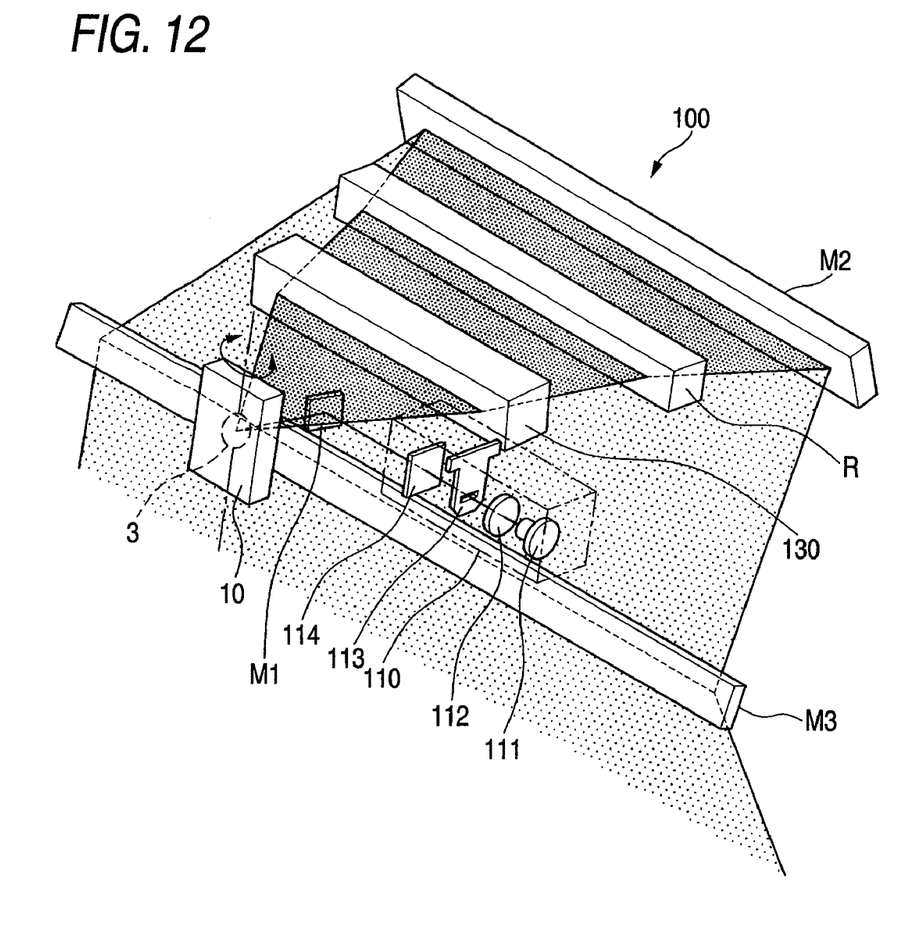
FIG. 12 is a schematic view showing the components of a light scanning device including a light deflector according to an exemplary embodiment.

A first exemplary embodiment of the present invention will be described below in detail with reference to the drawings. In the drawings, FIG. 1 is a plan view showing a light deflector according to a first exemplary embodiment of the present invention. FIG. 2 is a plan view of an MEMS mirror. FIG. 3 is a side view of the light deflector as seen from the arrow III in FIG. 1. FIG. 4 is a side view of the light deflector as seen from the arrow IV in FIG. 1. FIG. 12 is a schematic view showing the components of a light scanning device including a light deflector according to an exemplary embodiment. Firstly, referring to FIG. 12, overall configuration of the light scanning device 100 will be briefly described below.

[Light Scanning Device 100]

The light scanning device 100 according to a first exemplary embodiment is used in a scanner apparatus for a laser printer or the like. As shown in FIG. 12, the light scanning device 100 mainly comprises a light source unit 110, a first mirror M1, an oscillating mirror 3, a first scanning lens 130 as a scanning optics lens, a second scanning lens R, a second mirror M2, a frame for supporting them, and a third mirror M3 disposed under the frame.

[Light Source Unit 110]

The light source unit 110 comprises a laser diode 111, a coupling lens 112, a diaphragm member 113, and a cylindrical lens 114, as shown in FIG. 12. And a laser beam emitted from the laser diode 111 passes through the coupling lens 112, the diaphragm member 113 and the cylindrical lens 114, and then is reflected from the first mirror M1 to be directed to a MEMS package 10.

[Light Deflector L]

As shown in FIG. 1, the light deflector L according to the first exemplary embodiment mainly comprises an MEMS mirror 1 of an electromagnetic drive type for changing a reflection direction of a light emitted from the light source unit 110. Also, the light deflector L comprises an MEMS package 10 as one example of the mirror holder and one pair of support members 8, 8.

[MEMS Mirror 1]

As shown in FIG. 2, the MEMS mirror 1 is manufactured by applying a semiconductor process technology, and includes a mirror support member 2 formed like a horizontally oriented rectangular plate and a planar oscillating mirror 3 having the shape of a horizontally oriented ellipse is cut out and formed in the central part of the mirror support member 2.

The mirror support member 2 supports the oscillating mirror 3 via the upper and lower shanks 4, 4 cut and left in the central part to be rotated and oscillated. Herein, the shanks 4, 4 are elastically deformable.

In the central part of the surface of the oscillating mirror 3 with the shanks 4, 4 as a rotational oscillation axis (first axis) A, a total reflection mirror face 5 for changing the reflection direction of the light emitted from the light source unit 110 is formed in the shape of a horizontally oriented, rectangle, for example, by proper means such as evaporation.

Though not shown in the figures, the mirror support member 2 has a permanent magnet disposed in a portion surrounding the oscillating mirror 3, and a plane coil for receiving an action of magnetic field by the permanent magnet on the side of the mirror support member 2 is formed around the mirror face 5 of the oscillating mirror 3. Thereby, if a current flows through the plane coil, the oscillating mirror 3 is rotated and oscillated (vibrated) in a predetermined range about the rotational oscillation axis A by an electromagnetic force and an elastic force of the shank 4. In this manner, since the oscillating mirror 3 is rotated and oscillated in the predetermined range, the reflection direction of the light emitted from the light source unit 110 is changed by the oscillating mirror 3 to make the scanning.

[MEMS Package 10]

As shown in FIG. 1, the MEMS package 10 has a rectangular shape including a hollow for receiving the MEMS mirror 1, and the mirror support member 2 of the MEMS mirror 1 is fixed at an appropriate position inside the MEMS package 10, so that the oscillating mirror 3 is held via the mirror support member 2 to be rotated and oscillated. The MEMS package 10 includes an opening portion 10b for exposing the mirror face 5 of the oscillating mirror 3 to the outside on the front surface 10a.

An electrode 7 is provided on a central part of a lower side face 10c of the MEMS package 10 at the side of the front surface 10a so as to protrude along the rotational oscillation axis A from the front surface 10a in the central part of the lower side face 10c of the MEMS package 10, as shown in FIG. 3. The electrode 7 is connected to a wiring 6 for supplying electric power to the plane coil (not shown) of the oscillating mirror 3, as shown in FIG. 4. And this wiring 6 is drawn out from the side face (surface) 10c of the MEMS package 10 in parallel to the rotational oscillation axis A.

That is, in the first exemplary embodiment, a drawn-out start position of the wiring 6 is the position where the electrode 7 is provided. This position is located so as to intersect with (lie on) a plane which includes the rotational oscillation axis A of the oscillating mirror 3 and is orthogonal to the oscillating mirror 3 in a still state.

[Support Member 8]

As shown in FIGS. 1, 3 and 4, the support member 8 supports the MEMS package 10 and allows the MEMS package 10 to tilt about a support axis (second axis) B parallel to the rotational oscillation axis A of the oscillating mirror 3, in which two support members are disposed across the opening portion 10b on the front surface 10a of the MEMS package 10. Specifically, one pair of support members 8, 8 are provided so as to intersect with (lie on) a plane which includes the rotational oscillation axis A of the oscillating mirror 3 and is orthogonal to the oscillating mirror 3 in a still state.

Herein, the support members 8, 8 are provided on a frame (not shown) for supporting the MEMS package, for example, and the MEMS package 10 is pressed against the support members 8, 8 by a leaf spring (not shown) from a back face so that the MEMS package 10 is freely tiltably fixed on the frame. Thereby, the angle of the oscillating mirror 3 within the MEMS package 10 at the still state can be adjusted. The structure for making the angle adjustable may be realized by providing one leaf spring on each side of the MEMS package 10 across the support shaft B, and making one of the leaf springs movable in the longitudinal direction of the MEMS package 10, for example.

In the light deflector L as configured above, the electrode 7 at the drawn-out start position of the wiring 6 is arranged and protrudes out to intersect with (lie on) a plane which includes the rotational oscillation axis A of the oscillating mirror 3 and is orthogonal to the oscillating mirror 3 in the still state. Therefore, when the oscillating mirror 3 is rotationally oscillated, the oscillation transmitting to the electrode 7 becomes small.

Since the wiring 6 connected to the electrode 7 is drawn out in parallel with the rotational oscillation axis A of the oscillating mirror 3, the oscillation transmitting to the drawn-out portion of the wiring 6 due to the rotational oscillation of the oscillating mirror 3 becomes also small.

In addition, one pair of support members 8, 8 for freely tiltably supporting the MEMS package 10 is located so as to intersect with (lie on) the plane which includes the rotational oscillation axis A of the oscillating mirror 3 and is orthogonal to the oscillating mirror 3 in the still state. Therefore, the oscillation transmitting from the oscillating mirror 3 via the MEMS package 10 to the frame can be suppressed.

Accordingly, the light deflector L of the first exemplary embodiment can effectively reduce the oscillation noise of the wiring 6 caused by rotational oscillation of the oscillating mirror 3.

Second Exemplary Embodiment

Figure 5:
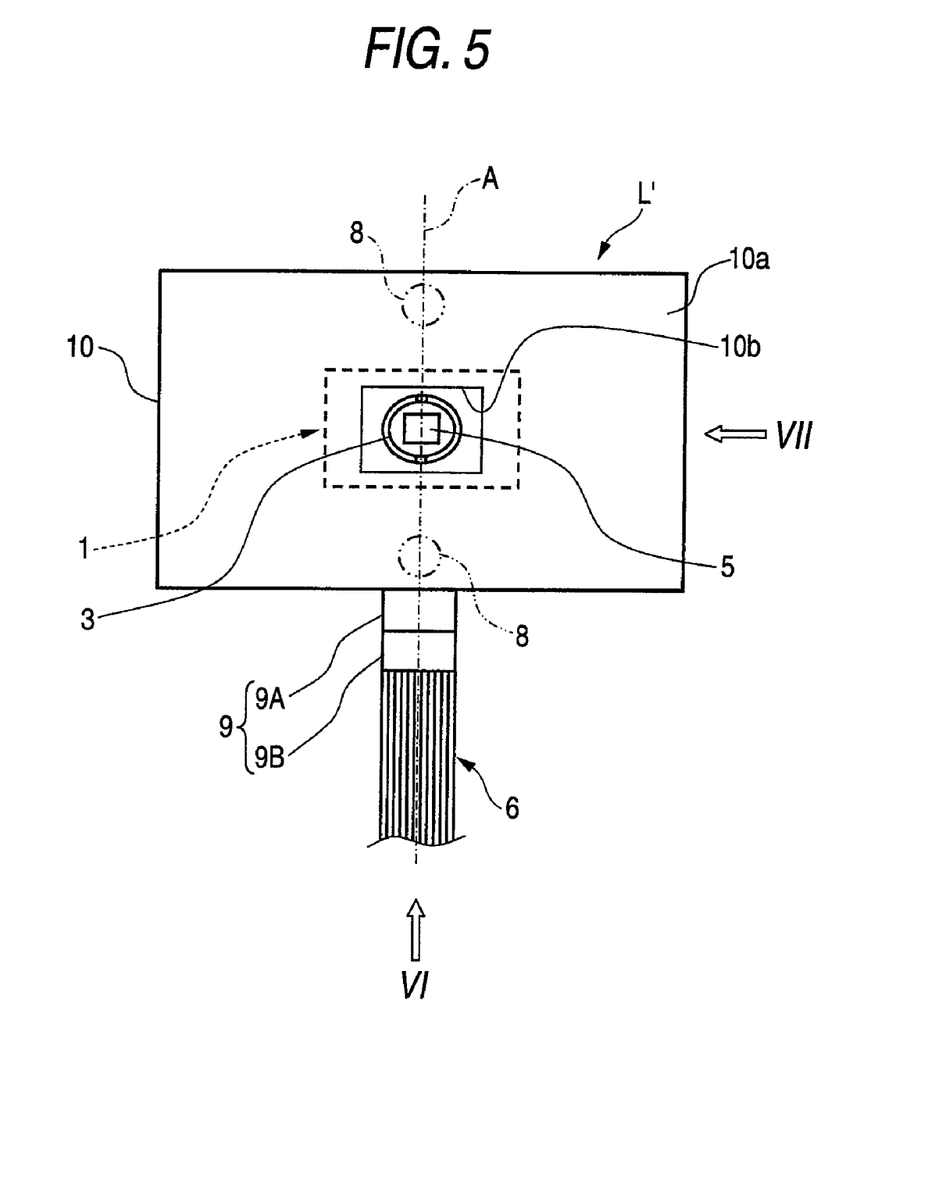
FIG. 5 is a plan view showing a light deflector according to a second exemplary embodiment of the present invention.

A second exemplary embodiment of the present invention will be described below in detail with reference to the drawings. In this embodiment, since a part of the configuration of the light deflector L according to the first exemplary embodiment is changed, the same reference numerals are attached to the same parts as in the first exemplary embodiment, and the explanation thereof is omitted. In the drawings for reference, FIG. 5 is a plan view showing a light deflector according to the second exemplary embodiment of the present invention. FIG.

Figure 6:
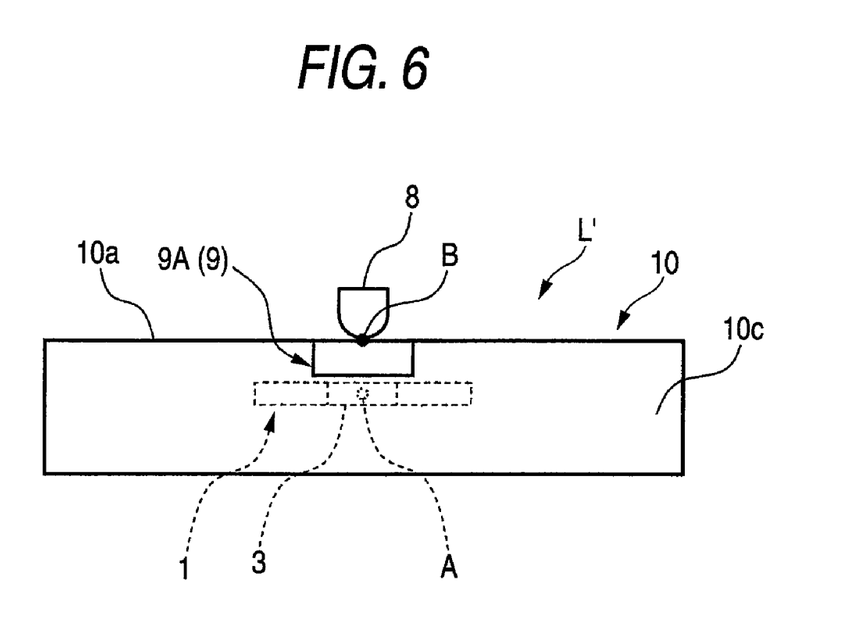
FIG. 6 is a side view of the light deflector as seen from the arrow VI in FIG. 5.
Figure 7:
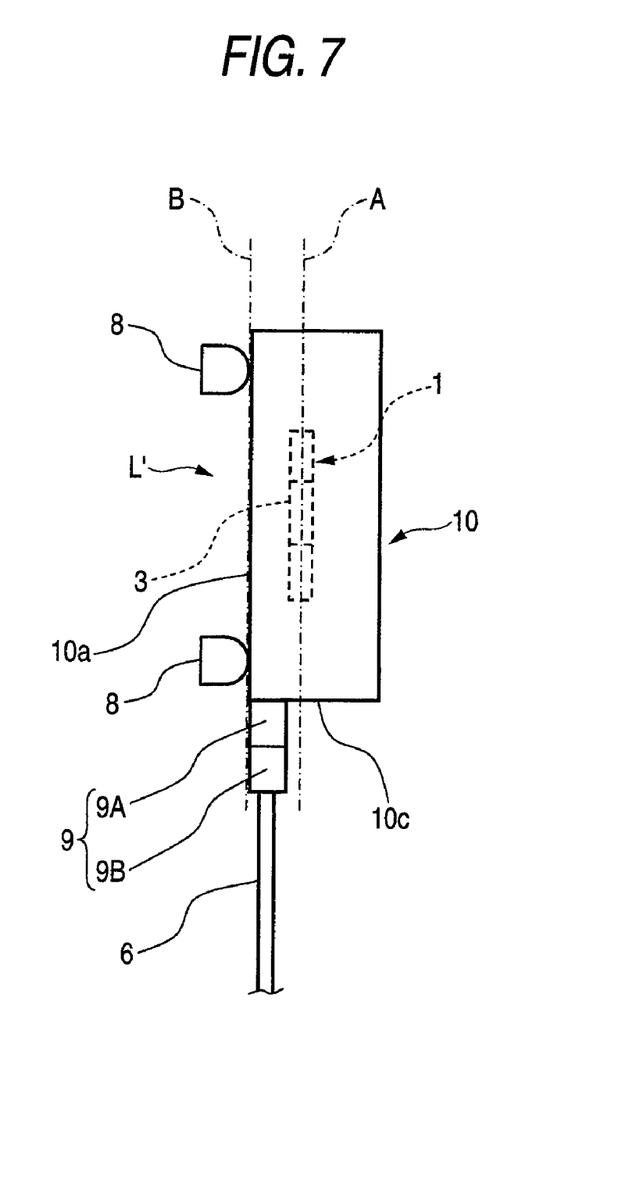
FIG. 7 is a side view of the light deflector as seen from the arrow VII in FIG. 5.

6 is a side view of the light deflector as seen from the arrow VI in FIG. 5. FIG. 7 is a side view of the light deflector as seen from the arrow VII in FIG. 5.

As shown in FIGS. 5 to 7, the light deflector L' according to the second exemplary embodiment has a connector 9 including a connector socket 9A and a connector plug 9B, instead of the electrode 7 at the pull-out start position of the wiring 6 in the first exemplary embodiment.

As shown in FIG. 6, the connector socket 9A is provided on a central part of a lower side face 10c of the MEMS package 10 at the side of the front surface 10a so as to protrude along the rotational oscillation axis A. As shown in FIG. 7, the wiring 6 is connected to the connector socket 9A via the connector plug 9B. And this wiring 6 is drawn out from the side face (surface) 10c of the MEMS package 10 in parallel with the rotational oscillation axis A.

That is, in the light deflector L' according to the second exemplary embodiment, the connector 9 at the drawn-out start position of the wiring 6 is arranged and protrudes out to intersect with (lie on) a plane which includes the rotational oscillation axis A of the oscillating mirror 3 and is orthogonal to the oscillating mirror 3 in the still state. Therefore, when the oscillating mirror 3 is rotationally oscillated, the oscillation transmitting to the connector 9 becomes small.

Since the wiring 6 connected to the connector 9 is drawn out in parallel with the rotational oscillation axis A of the oscillating mirror 3, the oscillation transmitting to the drawn-out portion of the wiring 6 due to the rotational oscillation of the oscillating mirror 3 becomes also small.

Accordingly, the light deflector L' of the second exemplary embodiment can effectively reduce the oscillation noise of the wiring 6 caused by rotational oscillation of the oscillating mirror 3.

Third Exemplary Embodiment

Figure 8:
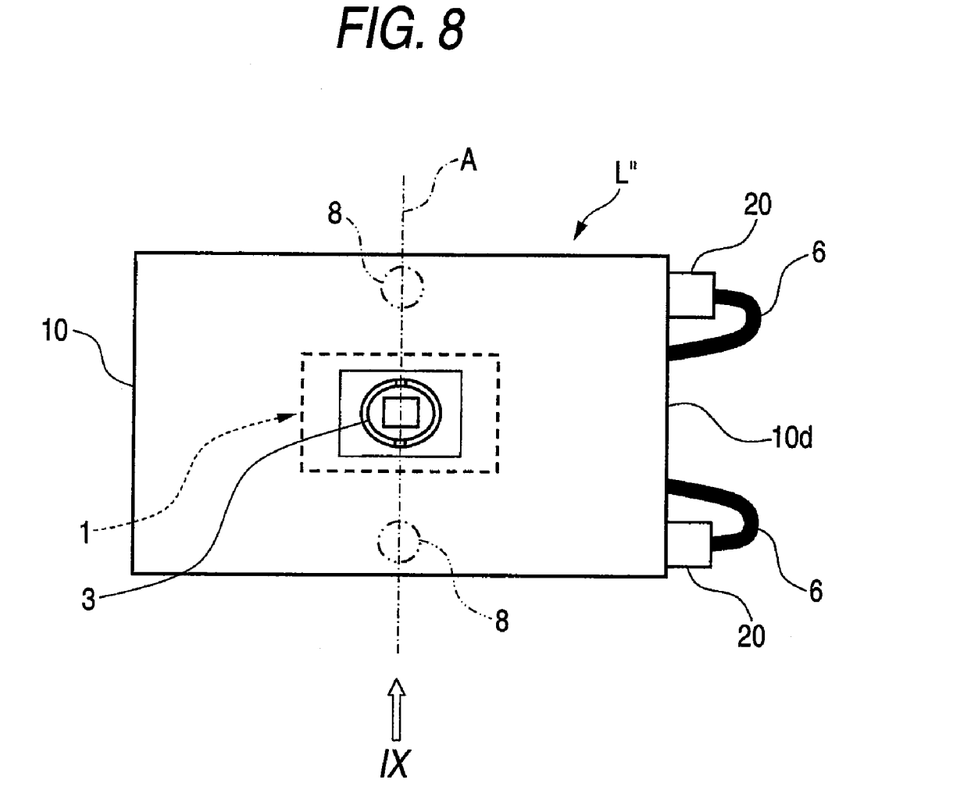
FIG. 8 is a plan view showing a light deflector according to a third exemplary embodiment of the present invention.
Figure 9:
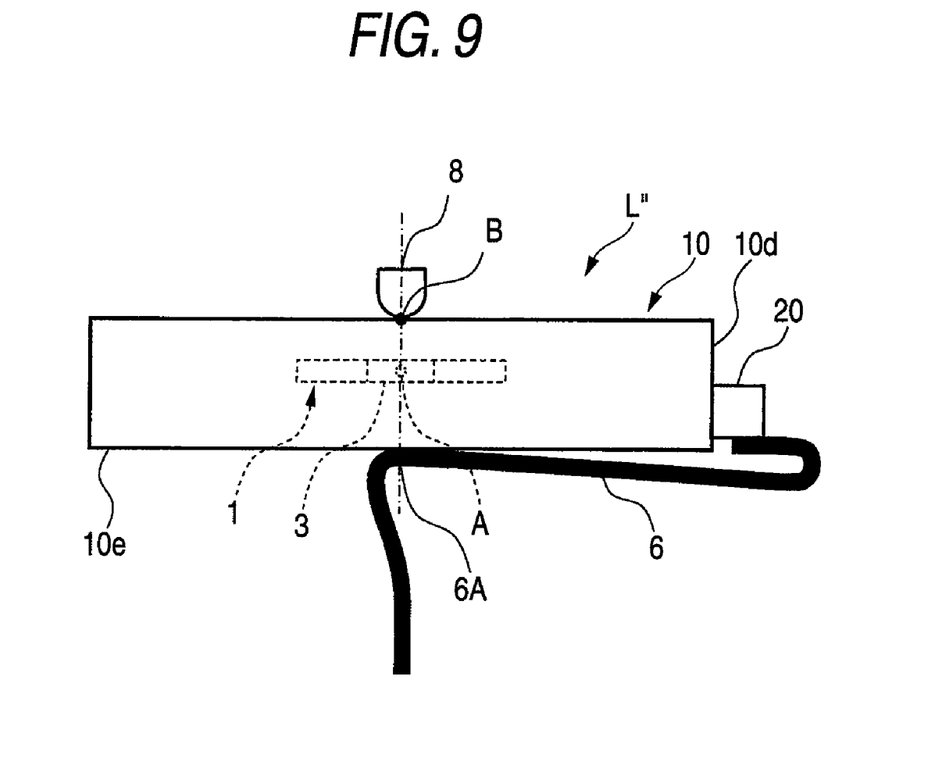
FIG. 9 is a side view of the light deflector as seen from the arrow IX in FIG. 8.
Figure 10:
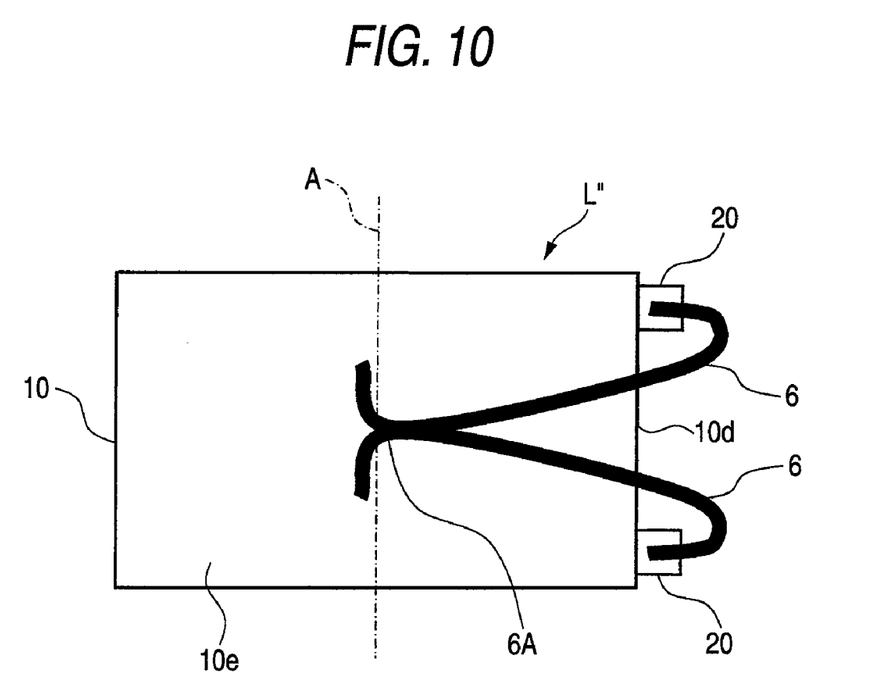
FIG. 10 is a rear view of the light deflector as shown in FIG. 8.

A third exemplary embodiment of the present invention will be described below in detail with reference to the drawings. In this embodiment, since a part of the structure of the light deflector L according to the first exemplary embodiment is changed, the same reference numerals are attached to the same parts as in the first exemplary embodiment, and the explanation thereof is omitted. In the drawings for reference, FIG. 8 is a plan view showing a light deflector according to the third exemplary embodiment of the present invention. FIG. 9 is a side view of the light deflector as seen from the arrow IX in FIG. 8. FIG. 10 is a rear view of the light deflector as shown in FIG. 8.

As shown in FIG. 8, in the light deflector L" according to the third exemplary embodiment, one pair of electrodes 20, 20 are provided to protrude outwardly, and one pair of wirings 6, 6 are connected to the electrodes at both ends of the right side face 10d of the MEMS package 10. Specifically, as shown in FIG. 9, each electrode 20 is disposed on the side face 10d of the MEMS package 10 at the side of the back face 10e. And the pair of wirings 6, 6 connected to the pair of electrodes 20, 20 are routed at a side of the back face 10e of the MEMS package 10 along the back face 10e, and gathered and fixed in the central part (gathering part 6A) of the back face 10e, as shown in FIGS. 9 and 10.

That is, in the third exemplary embodiment, the wiring 6 is not drawn out from the surface of the MEMS package 10 from each electrode 20 to the gathering part 6A, but fixed in the gathering part 6A and drawn out. In other words, the wiring 6 is routed along the surface of the MEMS package 10 to the gathering part 6A. Therefore, in the third exemplary embodiment, this gathering part 6A serves as the drawn-out start position of the wiring 6. And the gathering part 6A at the drawn-out start position of the wiring 6 is arranged in a region which intersects with (lies on) a plane which includes the rotational oscillation axis A of the oscillating mirror 3 and is orthogonal to the oscillating mirror 3 in a still state.

Note that it may be not necessary to gather the pair of wirings 6, 6 at the gathering part as long as the pair of wirings 6, 6 are drawn out from the region which intersects with (lies on) a plane which includes the rotational oscillation axis A of the oscillating mirror 3 and is orthogonal to the oscillating mirror 3 in a still state. That is, the pair of wirings 6, 6 may be drawn out separately.

As described above, with the light deflector L" according to the third exemplary embodiment, the gathering part 6A of the pair of wirings 6, 6 is located in the region which intersects with (lie on) a plane which includes the rotational oscillation axis A of the oscillating mirror 3 and is orthogonal to the oscillating mirror 3 in a still state. Therefore, the oscillation transmitting to the gathering part 6A of the pair of wirings 6, 6 becomes small, when the oscillating mirror 3 is rotationally oscillated. Then, the oscillation in the gathering part 6A of the pair of wirings 6, 6 caused by rotational oscillation of the oscillating mirror 3 can be suppressed, and the oscillation noise transmitting to the pair of wirings 6, 6 can be effectively reduced.

The present invention is not limited to exemplary embodiments described above with reference to the accompanying drawings. The following embodiments may also fall within the technical scope of the present invention.

Figure 13:
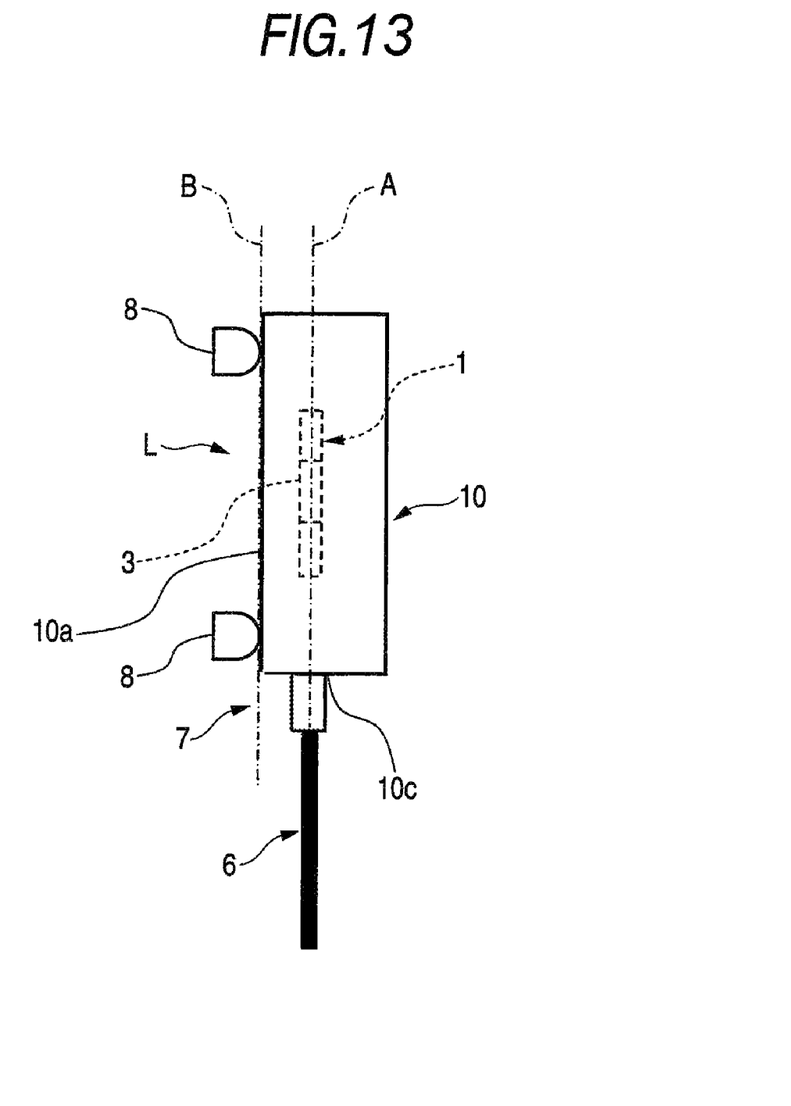
FIG. 13 is a view showing the components of a light scanning device including a light deflector according to another embodiment.

For example, though in the first and second exemplary embodiments, the wiring 6 is drawn out from the position away form the rotational oscillation axis A by a predetermined distance and in parallel therewith (see FIGS. 4 and 7), the wiring may be drawn from the position coincide with the rotational oscillation axis A along a line extending along the rotational oscillation axis A (see FIG. 13). Thereby, the oscillation of the wiring can be further suppressed.

Though in the third exemplary embodiment, two electrodes 20 are provided on the MEMS package 10, three or more electrodes may be provided.

Figure 11:
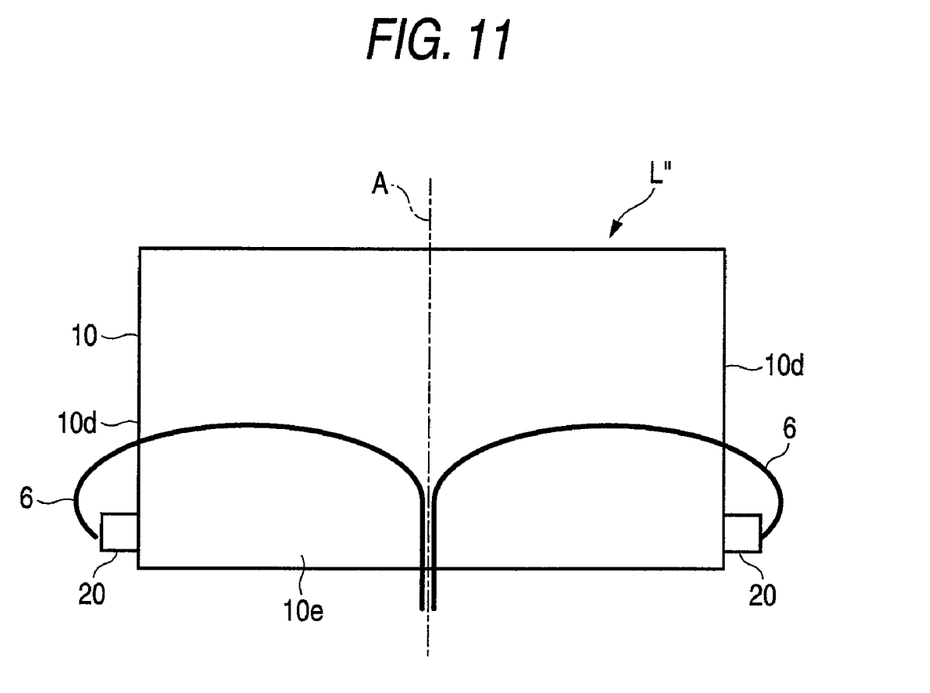
FIG. 11 is a rear view of a light deflector according to another exemplary embodiment of the present invention.

In addition, though in the third exemplary embodiment, the pair of electrodes 20, 20 are provided on one side face 10d, the pair of electrodes 20, 20 may be provided on side faces 10d, 10d located opposite side with each other with respect to the rotational oscillation axis A as shown in FIG. 11. In this case, the wirings 6, 6 can be routed symmetrically with respect to the rotational oscillation axis A. Therefore, the oscillation of the wiring can be further suppressed.

Though in each of the above embodiments, the MEMS mirror is driven by an electromagnetic drive method, an electrostatic drive method may be employed for oscillating the oscillating mirror by electrostatic force, for example.

Though in each of the above embodiments, the oscillating mirror is elliptical, the oscillating mirror may be rectangular or circular.

Though in each of the above embodiments, the wiring 6 supplies power to the oscillating mirror 3, the wiring may supply a control signal to the oscillating mirror 3.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A light deflector comprising:
   an oscillating mirror which includes a reflecting surface and which rotationally oscillates about a first axis;
   a mirror holder which holds the oscillating mirror; and
   a wiring drawn out from a surface of the mirror holder at a drawn-out start position, the drawn-out start position lying on a plane which includes the first axis and which is orthogonal to the reflecting surface of the oscillating mirror in a still state.

2. The light deflector according to claim 1,
   wherein the wiring supplies power to the oscillating mirror.

3. The light deflector according to claim 1,
   wherein the wiring is drawn out from the surface of the mirror holder in parallel with the first axis.

4. The light deflector according to claim 1,
   wherein the wiring is drawn out from the surface of the mirror holder along a line extending along the first axis.

5. The light deflector according to claim 1, further comprising a support member which supports the mirror holder and allows the mirror holder to tilt about a second axis parallel to the first axis,
   wherein the support member lies on the plane which includes the first axis and which is orthogonal to the reflecting surface of the oscillating mirror in the still state.

6. The light deflector according to claim 1, further comprising an electrode which couples the wiring to the mirror holder.

7. The light deflector according to claim 1, further comprising a connector which couples the wiring to the mirror holder.

8. The light deflector according to claim 1, further comprising a plurality of electrodes,
   wherein the wiring comprises a plurality of wirings coupled to corresponding electrodes of the plurality of electrodes, and
   wherein the plurality of wirings are fixed on the surface of the mirror holder at the drawn-out start position.

9. The light deflector according to claim 8,
   wherein the plurality of wirings are gathered and fixed at the drawn-out start position.

10. The light deflector according to claim 8,
    wherein the plurality of electrodes are provided on both sides of the mirror holder with respect to the plane.

11. A light scanning device comprising:
    a light emitter which emits light;
    an oscillating mirror which includes a reflecting surface and which rotationally oscillates about a first axis;
    a mirror holder which holds the oscillating mirror; and
    a wiring drawn out from a surface of the mirror holder at a drawn-out start position, the drawn-out start position lying on a plane which includes the first axis and which is orthogonal to the reflecting surface of the oscillating mirror in a still state.

12. The light deflector according to claim 11,
    wherein the wiring supplies power to the oscillating mirror.

13. The light deflector according to claim 11,
    wherein the wiring is drawn out from the surface of the mirror holder in parallel with the first axis.

14. The light deflector according to claim 11,
    wherein the wiring is drawn out from the surface of the mirror holder along a line extending along the first axis.

15. The light deflector according to claim 11, further comprising:
    a frame on which the light emitter is mounted; and
    a support member which is fixed to the frame and which supports the mirror holder and allows the mirror holder to tilt about a second axis parallel to the first axis,
    wherein the support member lies on the plane which includes the first axis and which is orthogonal to the reflecting surface of the oscillating mirror in the still state.

16. The light deflector according to claim 11, further comprising an electrode which couples the wiring to the mirror holder.

17. The light deflector according to claim 11, further comprising a connector which couples the wiring to the mirror holder.

18. The light deflector according to claim 11, further comprising a plurality of electrodes,
    wherein the wiring comprises a plurality of wirings coupled to corresponding electrodes of the plurality of electrodes, and
    wherein the plurality of wirings are fixed on the surface of the mirror holder at the drawn-out start position.

19. The light deflector according to claim 18,
    wherein the plurality of wirings are gathered and fixed at the drawn-out start position.

20. The light deflector according to claim 18,
    wherein the plurality of electrodes are provided on both sides of the mirror holder with respect to the plane.

21. A light deflector comprising:
    an oscillating mirror which includes a reflecting surface and which rotationally oscillates about a first axis;
    a mirror holder which holds the oscillating mirror; and
    a wiring drawn out from a surface of the mirror holder at a drawn-out start position, the drawn-out start position lying on a plane which intersects the first axis and which is orthogonal to the reflecting surface of the oscillating mirror in a still state.

* * * * *